United States Patent [19]

Im et al.

[11] Patent Number: 4,547,351

[45] Date of Patent: Oct. 15, 1985

[54] FLUE GAS DESULFURIZATION

[75] Inventors: Kwan H. Im, Lisle; Rajesh K. Ahluwalia, Clarendon Hills, both of Ill.

[73] Assignee: The United States of America as represented by the United States Department of Energy, Washington, D.C.

[21] Appl. No.: 605,951

[22] Filed: May 1, 1984

[51] Int. Cl.$^4$ .................. B01D 53/34; B01J 10/00; F23J 15/00

[52] U.S. Cl. .................. 423/242; 423/244; 423/551; 55/2; 55/5; 422/173; 422/198; 110/203; 110/216; 110/342; 110/343; 110/345

[58] Field of Search .............. 423/207, 215.5, 242 A, 423/244 A, 551; 55/2, 5; 422/173, 198; 110/203, 205, 207, 215, 216, 347, 341–345

[56] References Cited

U.S. PATENT DOCUMENTS

| 1,357,466 | 11/1920 | Moller | 55/2 |
| 1,794,006 | 2/1931 | Falla | 423/207 X |
| 3,320,906 | 5/1967 | Domahidy | 423/244 A |
| 4,001,384 | 1/1977 | Iwakura et al. | 423/244 A |
| 4,176,163 | 11/1979 | Nelson | 423/242 A |
| 4,226,601 | 10/1980 | Smith | 110/347 |
| 4,377,118 | 3/1983 | Sadowski | 110/343 |

Primary Examiner—Earl C. Thomas
Attorney, Agent, or Firm—William Lohff; James W. Weinberger; Judson R. Hightower

[57] ABSTRACT

A process and apparatus for removing sulfur oxide from combustion gas to form $Na_2SO_4$ and for reducing the harmful effects of $Na_2SO_4$ on auxiliary heat exchangers in which a sodium compound is injected into the hot combustion gas forming liquid $Na_2SO_4$ in a gas-gas reaction and the resultant gas containing $Na_2SO_4$ is cooled to below about 1150° K. to form particles of $Na_2SO_4$ prior to contact with at least one heat exchanger with the cooling being provided by the recycling of combustion gas from a cooled zone downstream from the introduction of the cooling gas.

10 Claims, 3 Drawing Figures

FLUE GAS DESULFURIZATION

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to a process and apparatus associated with the reduction of the sulfur oxide content of combustion gases produced by the combustion of organic fuels containing sulfur. In particular, the invention relates to the reduction of sulfur dioxide content under conditions which also reduce the fouling of heat exchanger tubes exposed to the combustion gases.

Combustion of sulfur bearing fuels forms sulfur dioxide and some sulfur trioxide which combine with moisture within the environment to produce what is commonly called acid rain. Such environmental intrusion is of great concern and has lead to federal regulations which establish emission standards. Several processes to control the emission of sulfur dioxide presently exist. However, in many instances these processes involve the use of expensive process equipment which adds to the cost of the operation.

One conventional gas desulfurization process involves the use of lime/limestone scrubbers to form $CaSO_3/CaSO_4$ from the sulfur oxide. In this process, a lime slurry is sprayed into the combustion gas which reduces the temperature of the gas. Usually a reheating of the gas is required before the gas enters the stack. The cost of the scrubbers, their operation in the process and the reheating of the combustion gas add to the cost of the overall operation. Processes which illustrate the use of aqueous alkaline reactants for sulfur dioxide removal are disclosed in U.S. Pat. Nos. 4,197,278, 4,198,380, 4,410,500, 4,385,039, 4,325,713, 4,208,381.

In another process, aqueous sodium sulfite or a mixture with sodium sulfate is used as an absorption solution for contact with sulfur dioxide. U.S. Pat. Nos. 4,079,119 and 4,206,187 provide disclosures of these processes.

When the combustion process is part of glass-making operations, sodium hydroxide or other sodium compound is contacted with the combustion gas to form sodium sulfite or sodium sulfate. U.S. Pat. Nos. 3,944,650; 4,001,384; and 4,176,163.

A different process as described in U.S. Pat. No. 3,369,504 involves the addition of finely divided or gaseous NaCl to the boiler to react with sulfur dioxide and/or sulfur trioxide. Scrubbing may be used to remove the hydrogen chloride and sodium sulfate is removed with the boiler ash.

An additional problem is often associated with sodium sulfate when it is formed in or near the furnace. In conventional combustion processes, heat from the hot combustion gases is transferred to boiler tubes in the furnace and subsequently to a plurality of auxiliary heat exchangers downstream from the furnace. When $Na_2SO_4$ is formed upstream from these heat exchangers at the higher temperatures associated with sulfate formation, the $Na_2SO_4$ is usually liquid at the higher temperatures and tends to deposit on the heat exchanger surfaces together with ash particles thereby reducing the effectiveness of the heat transfer operation.

Accordingly, one object of the invention is a process and associated apparatus for the reduction in the sulfur oxide content of gas formed from combustion of sulfur-bearing fuels. A second object is the conversion of sulfur oxide to a sulfate product at higher temperatures associated with the furnace or adjacent downstream sections. A third object is a process for reducing harmful effects of $Na_2SO_4$ in a combustion gas without substantial modification of existing equipment. Another object of the invention is the avoidance of adding heat to the flue gas prior to entering the stack. A further object is the reduction in heat exchanger fouling associated with some systems for reducing the sulfur oxide content. Yet another object of the invention is one or more combinations of the above objects. These and other objects will become apparent from the following detailed description.

SUMMARY OF THE INVENTION

Briefly, the invention involves a combustion process in which combustion gas containing sulfur oxide is directed past a series of heat exchangers to a stack and in which a sodium compound is added to the combustion gas in a temperature zone of above about 1400 K. to form $Na_2SO_4$. Preferably, the temperature is above about 1800 K. and the sodium compound is present as a vapor to provide a gas-gas reaction to form $Na_2SO_4$ as a liquid. Since liquid $Na_2SO_4$ may cause fouling of heat exchanger surfaces downstream from the combustion zone, the process advantageously includes the step of injecting a cooling gas downstream of the injection of the sodium compound yet upstream of one or more heat exchangers to cool the combustion gas to below about 1150 K. and form solid $Na_2SO_4$. The cooling gas is preferably a portion of the combustion gas downstream which may be recycled for cooling. It is further advantageous to utilize an electrostatic precipitator downstream of the heat exchangers to recover the $Na_2SO_4$. It is also advantageous in the process to remove a portion of the combustion gas cleaned in the electrostatic precipitator and recycle that portion upstream to use as the cooling gas.

Several advantages result from the process. In the gas-gas reaction, more of the sodium compound is available for the reaction. Cooling of the combustion gas to form solid $Na_2SO_4$ upstream of one or more heat exchangers reduces the probability that fouling of heat exchanger tubes will occur. Formation of $Na_2SO_4$ avoids the need for lime/limestone scrubbers and their adverse effect on thermal efficiency. Further, $Na_2SO_4$ may be recovered downstream by electrostatic precipitators and is a composition having some commercial value and industrial uses.

DETAILED DESCRIPTION OF THE PREFERRED EMBODIMENT

Figure 1:
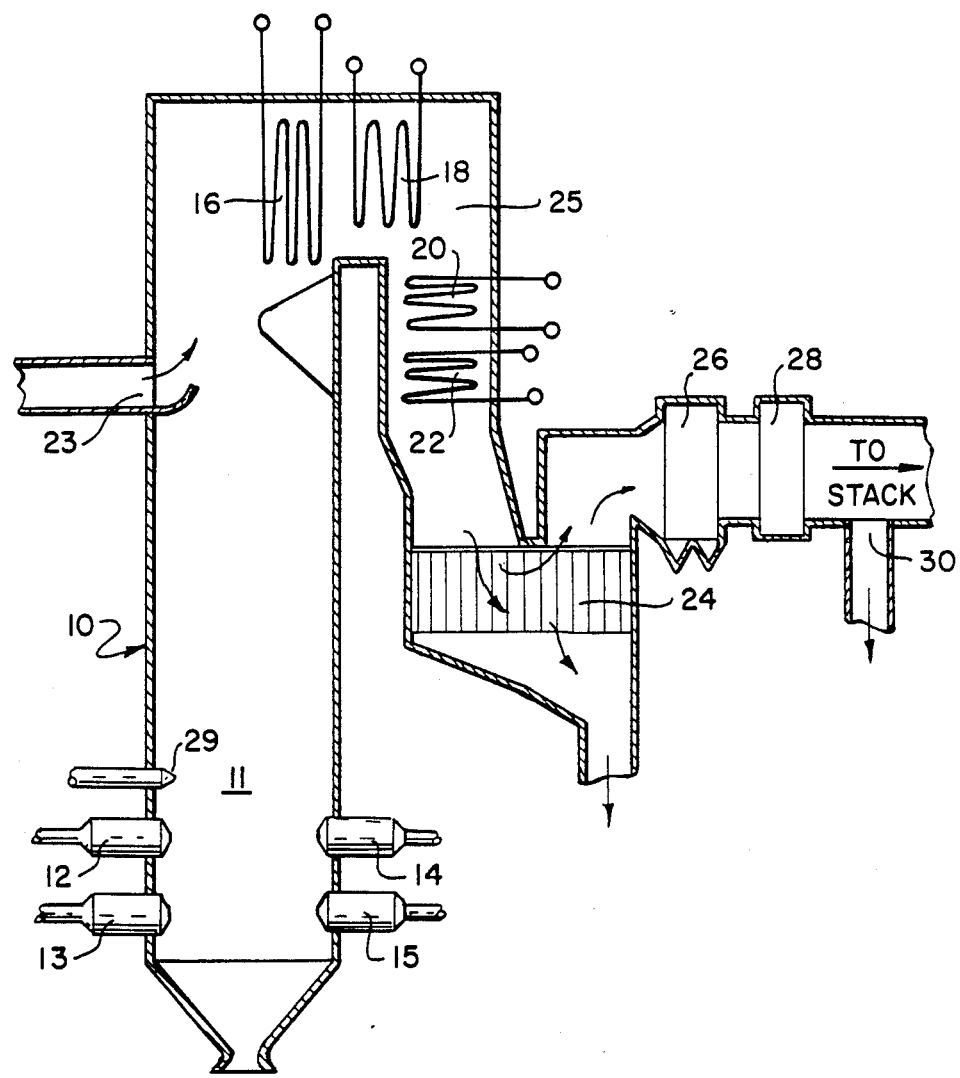
FIG. 1 is a flow diagram of one embodiment of the invention.

Conventional combustion processes utilizing a sulfur-bearing fuel such as coal generate a hot combustion gas at temperatures in the order of 1900-2200 K. At these temperatures, the combustion gas is directed past one or more heat exchangers in exit duct work to extract heat and then directed to the stack. Sulfur oxides in the combustion gases either are removed or exit with the stack gases. In many instances with a lignite fuel, some $Na_2SO_4$ is formed in the combustion zone from sodium compounds in the fuel. In liquid form, the $Na_2SO_4$ tends to coat heat exchanger surfaces thereby reducing the heat transfer rate.

In this invention, the sulfur oxide content of the gas is effectively reduced by the addition of a sodium compound into the combustion gas at a temperature above about 1400 K. to react with the sulfur oxide to form $Na_2SO_4$. Preferably, the temperature is above about 1800 K. where the sodium compound is present as a vapor or gas and reacts with the sulfur oxide in a gas-gas reaction to form $Na_2SO_4$. Under these conditions, the $Na_2SO_4$ is formed as a liquid and unless adequate cooling of the combustion gas is provided, the liquid $Na_2SO_4$ may coat exposed heat exchanger surfaces downstream of the reaction zone. Accordingly, the process includes a gas cooling step in which $Na_2SO_4$ in the combustion gas is converted to form solid $Na_2SO_4$ upstream of one or more heat exchangers to reduce the fouling problem with liquid $Na_2SO_4$.

Accordingly, the invention provides apparatus and a process for reducing harmful effects of $Na_2SO_4$ in combustion gas generated by the combustion of a sulfur-bearing fuel. The apparatus includes a furnace or other means for providing combustion gas at a temperature above about 1400 K. and containing $Na_2SO_4$ formed in a reaction between a sodium compound of sulfur oxide, a plurality of heat exchangers for transferring or extracting heat from the combustion gas, ductwork or other means for directing the combustion gas past at least one of the heat exchangers for the desired heat transfer, and ductwork or other means for introducing a cooling gas into the combustion gas upstream from one of the heat exchangers to reduce the temperature of the combustion gas to below about 1150 K. and form particles of $Na_2SO_4$.

The inventive process is carried out by providing combustion gas at a temperature above about 1400 K. and containing $Na_2SO_4$, introducing a cooling gas into the combustion gas to reduce the temperature of the combustion gas to below about 1150 K. and form particles of $Na_2SO_4$, and directing the cooled combustion gas past at least one of the above heat exchangers.

Preferably, the cooling step is effective to reduce the gas temperature to below about 1150 K. In addition, an electrostatic precipitation is utilized downstream of the heat exchangers to remove the solid sodium sulfate. Advantageously, the precipitation is multistage to sequentially remove fly ash and then $Na_2SO_4$, thereby reducing any contamination of the $Na_2SO_4$ by ash.

The sodium compound may be vaporized at about 1660 K. and above and suitably is $Na_2CO_3$, $NaHCO_3$, NaCl, NaOH or the like and advantageously $Na_2CO_3$, $NaHCO_3$ or NaOH to avoid the acid problem with NaCl. Preferably, the compound is an NaOH-affording compound. It may be injected as a dry powder, or mixed with water, or in a dry mixture with pulverized coal or the like.

In the process, a series of heat exchanger tubes are exposed to the combustion gases. These heat exchangers include secondary and primary superheaters, a reheater and an economizer. In the embodiment illustrated in FIG. 1, coal or other sulfur bearing fuel is burned in a furnace 10 to produce a combustion gas. Conventionally, the coal is supplied through burner inlets 12, 13, 14 and 15 spaced about the furnace with combustion air being preheated in an air preheater 24 in the exit piping 25 and then fed (not shown) to the furnace 10. In the combustion zone 11 of the furnace 10, combustion gases are developed at temperatures in the order of about 2000-2200 K. and are directed past a plurality of heat exchangers 16, 18, 20 and 22 to extract heat for generating steam and other purposes. An air preheater 24 is downstream from the heat exchangers 16, 18, 20 and 22 to preheat combustion air. Following the preheater 24, the gases are sent to an electrostatic precipitator 26-28. In the process, the combustion and furnace exit temperatures are usually controlled based on the selection of a particular coal or other fuel.

As the combustion gases move downstream, their heat is partially extracted by a plurality of heat exchangers 16, 18, 20 and 22 in the piping or ductwork 25. As illustrated, the heat exchangers 16, 18, 20 and 22 are sequentially arranged and are identified with a secondary superheater 16, a reheater 18, a primary superheater 20 and an economizer 22. As the combustion gas flows past the heat exchangers, 16, 18, 20 and 22, heat is transferred to the fluids within the heat exchangers. Next, the combustion gas is directed through a preheater 24 in which combustion gas is preheated before being sent to the furnace 10. The combustion gas is then sent to one or more electrostatic precipitator stages 26 and 28 in which the ash particulates and solid $Na_2SO_4$ are removed. The exit gas then is sent to the stack (not shown).

In the invention, the sulfur oxide and primarily sulfur dioxide content of the combustion gases is effectively removed by contact with a vaporized sodium compound in a gas-gas reaction to produce sodium sulfate. The sodium compound is injected at point 29 in an amount sufficient to react with and convert the sulfur oxide to sodium sulfate. Usually, the amount is a stoichiometric or near stoichiometric amount. The injection of the sodium compound into the furnace 10 is in dry form, or slurry form or in a solution and is then vaporized to provide a gaseous reactant. In the reaction, sodium sulfate is formed at temperatures of 1700-2000 K. which on cooling forms liquid droplets in the order of micron in size. Subsequently and upstream of the heat exchangers 16, 18, 20 and 22, the combustion gases are tempered by the injection of a cooling gas into the furnace 10 at inlet 23 to cool the combustion gas to below about 1150 K. (the melting temperature of the $Na_2SO_4$) and solidify the sodium sulfate particles. The formation of solid sodium sulfate prevents or reduces fouling of the heat exchangers which would otherwise occur by the deposit of liquid sodium sulfate and particulates on the tubes 16, 18, 20 and 22. Advantageously, the cooling gas is supplied by recycling a portion of the combustion gas from a point downstream 30 of the electrostatic precipitator 28. Since the gas exiting from the precipitator 28 is relatively clean, its use as cooling gas provides a relatively clean gas for injection upstream. In the precipitators 26 and 28, the fly ash may be removed in the first stage with the $Na_2SO_4$ particles (usually smaller than the fly ash particulates) being removed in the second stage. Generally, these materials are disposed in clay lined sites although some efforts are being conducted to convert $Na_2SO_4$ to $Na_2CO_3$ for reuse in the process.

The amount of tempering gas is sufficient to obtain the desired reduction in temperature and is dependent on the temperature of the combustion gas. Usually, the amount is in the order of 45–60% of the combustion gas. While the addition of the cooling gas may reduce the radiant heat transfer due to the lower gas temperature, the increased velocity is expected to enhance the convective heat transfer coefficient. Accordingly, it may be necessary to have a larger surface area 16 for the secondary superheater by about 15–30% while the surface area 18, 20 and 22 for the other heat exchangers may be reduced by approximately 15% because of the increased convective heat transfer coefficient. In the electrostatic precipitators 26 and 28, the presence of $Na_2SO_4$ is expected to improve the process since the electrical conductivity of the particle is improved together with the resultant efficiency of the precipitation process.

Figure 2:
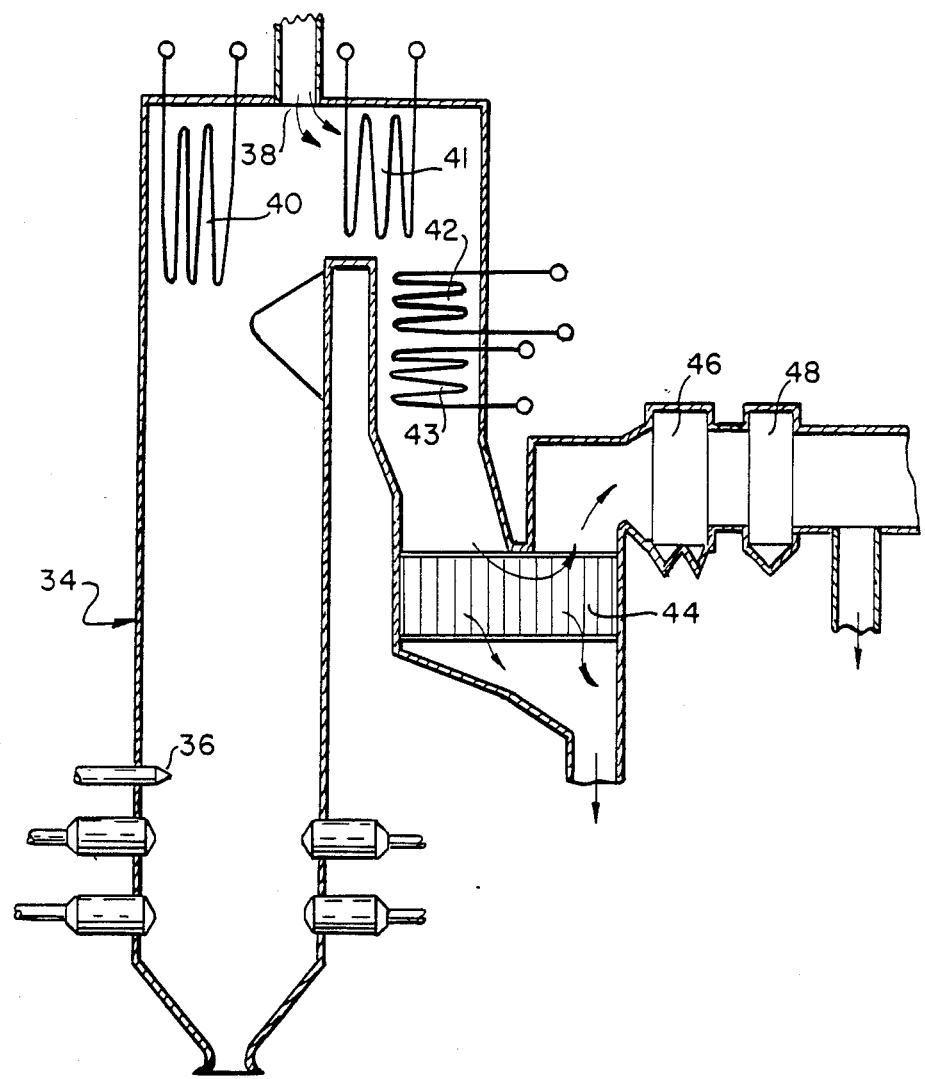
FIG. 2 is a flow diagram of a second embodiment of the invention.

FIG. 2 is an illustration of a second embodiment of the invention. As illustrated, the sodium compound is injected at point 36 into the furnace 34 and the cooling gas is injected at point 38 directly downstream of the secondary preheater 40. In this embodiment, the exit gas of the furnace 34 is at a high temperature (as high as possible and above about 1500 K.). When the temperature is above the dew point for sodium sulfate (about 1700 K.), the sodium sulfate forms a free flowing liquid on the secondary superheater tubes 40 and carries with it particulates of fly ash which otherwise might deposit on the tubes. When the temperature is below the dew point and above 1500 K., liquid droplets of sodium sulfate deposit on the tubes. It is important under these conditions that the gas velocity is sufficient to promote the formation of a liquid sodium sulfate film on the tubes 40. At temperatures below about 1500 K. and above 1150 K., the sodium sulfate tends to become viscous or sticky and may cause fouling of the tubes 41–43. Therefore, cooling gas is injected into the combustion gas to cool it to below about 1150 K. prior to the remaining heat exchanger tubes 41–43 to reduce the fouling problem. Following the air preheater 44, the combustion gases are fed to a two-stage precipitator 46 and 48 to selectively remove fly ash and sodium sulfate.

Figure 3:
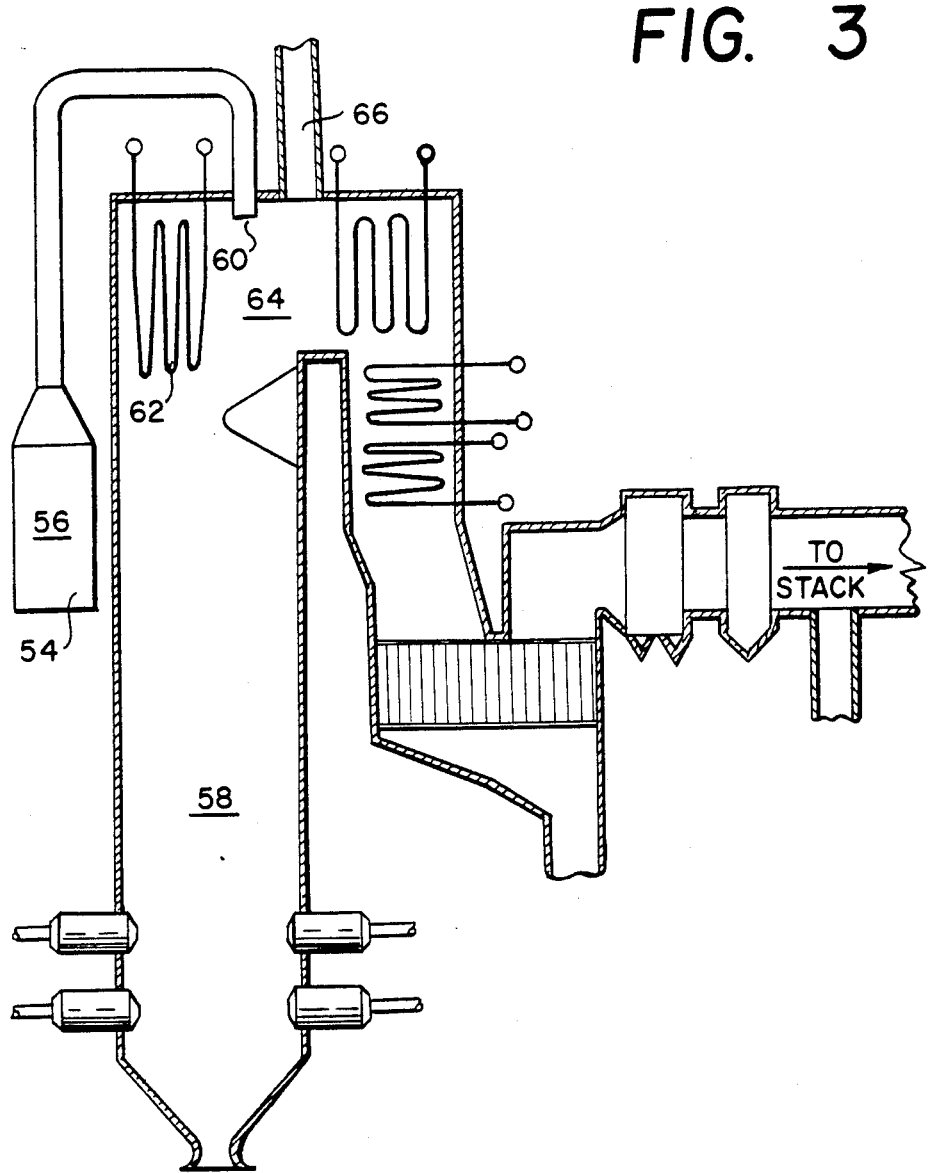
FIG. 3 is a flow diagram of a third embodiment of the invention.

In FIG. 3, a sodium compound is vaporized in a small separate chamber 54 which may be a separate furnace 56 or be a bypass from the furnace 58. The vaporized sodium compound is injected at a point 60 downstream of the secondary superheater 62 at a temperature of about 1650–1750 K. and reacts with the sulfur oxide. The temperature of the combustion gas is about 1200 K. In the same zone 64, the cooling gas is injected at point 66 to reduce the temperature to below about 1150 K. Since the combustion gas is close to 1150 K., the amount of cooling gas is expected to be less than used in the embodiments of FIGS. 1–2.

As illustrated in FIGS. 1–3, the invention provides a system to reduce the sulfur oxide content of combustion gas. In addition, the system provides a control of temperature to reduce fouling of heat exchanger tubes exposed to the gas. In the three embodiments of FIGS. 1–3, the injection of the sodium compound and the injection of the cooling gas are selected according to the furnace exit temperature or the desirability of maintaining a free-flowing film of liquid sodium sulfate on the secondary superheater.

The embodiments of the invention in which an exclusive property or privilege is claimed are defined as follows:

1. Apparatus for reducing harmful effects of $Na_2SO_4$ in combustion gas generated by the combustion of a sulfur-bearing fuel, comprising
   means including a combustion zone for providing a $Na_2SO_4$-containing combustion gas downstream of the combustion zone, said providing means including means for introducing a sodium compound into a sulfur oxide-containing combustion gas at a temperature above about 1400 K., and in an amount sufficient to convert said sulfur oxide to $Na_2SO_4$ in a gas-gas reaction to form said $Na_2SO_4$-containing combustion gas,
   heat exchanger means including at least one heat exchanger for transferring heat from the $Na_2SO_4$-containing combustion gas,
   means for directing the $Na_2SO_4$-containing combustion gas past said one heat exchanger for said heat transfer to form a cooling combustion gas,
   means for withdrawing a portion of the cooling combustion gas downstream from said heat exchanger, and
   means for introducing the cooling gas into the $Na_2SO_4$-containing combustion gas upstream from said one heat exchanger, to reduce the temperature of the $Na_2SO_4$-containing combustion gas to below about 1150 K. and form particles of $Na_2SO_4$.

2. The apparatus of claim 1 wherein said combustion gas is above about 1800 K., said directing means includes precipitator means for removing particulates from the combustion gas, and said cooling gas is withdrawn downstream from the precipitator means.

3. The apparatus of claim 2 wherein the precipitator means includes first and second stages to sequentially remove ash particulates and $Na_2SO_4$ particulates, respectively.

4. The apparatus of claim 1 including a series of heat exchangers and wherein said means for introducing said cooling gas is downstream of the first heat exchanger in said series.

5. The apparatus of claim 4 wherein said means for introducing the sodium compound introduces the compound downstream of the first heat exchanger but upstream of the introduction of said cooling gas.

6. A process for reducing harmful effects of $Na_2SO_4$ in a combustion gas in the transfer of heat to at least one heat exchanger comprising the steps of
   providing a sulfur oxide-containing combustion gas at a temperature above about 1400 K.,
   introducing a sodium compound into the combustion gas in an amount sufficient to convert said sulfur oxide to $Na_2SO_4$ in a gas-gas reaction and form a $Na_2SO_4$-containing combustion gas,
   introducing a cooling gas into the $Na_2SO_4$-containing combustion gas to reduce the temperature of the combustion gas to below about 1150 K. and form particles of $Na_2SO_4$ in a cooled combustion gas, directing the cooled combustion gas past at least one heat exchanger, and withdrawing a portion of the cooled combustion gas downstream of said one heat exchanger as said cooling gas.

7. The process of claim 6 wherein the sulfur oxide-containing combustion gas is above about 1800 K. and the process includes the step of precipitating particles from the cooled combustion gas downstream from said one heat exchanger and wherein the withdrawing of the cooled combustion gas is downstream from the precipitating step to provide a relatively clean cooling gas.

8. The process of claim 7 wherein the introduction of the sodium compound provides a member of the class consisting of sodium carbonate, sodium bicarbonate, sodium hydroxide and sodium chloride.

9. The process of claim 8 wherein the step of directing the combustion gas past said one heat exchanger results in the passages of the combustion gas past a series of heat exchangers, and the introduction of the cooling gas is downstream of the first of said heat exchangers.

10. The process of claim 9 wherein the introduction of the sodium compound is upstream from the introduction of the cooling gas but downstream of the first of the heat exchangers.

* * * * *